April 22, 1930.  R. E. JORDAN  1,755,878
CONTINUOUS SMOKING, CURING, AND TREATING APPARATUS
Original Filed Sept. 18, 1925   4 Sheets-Sheet 1

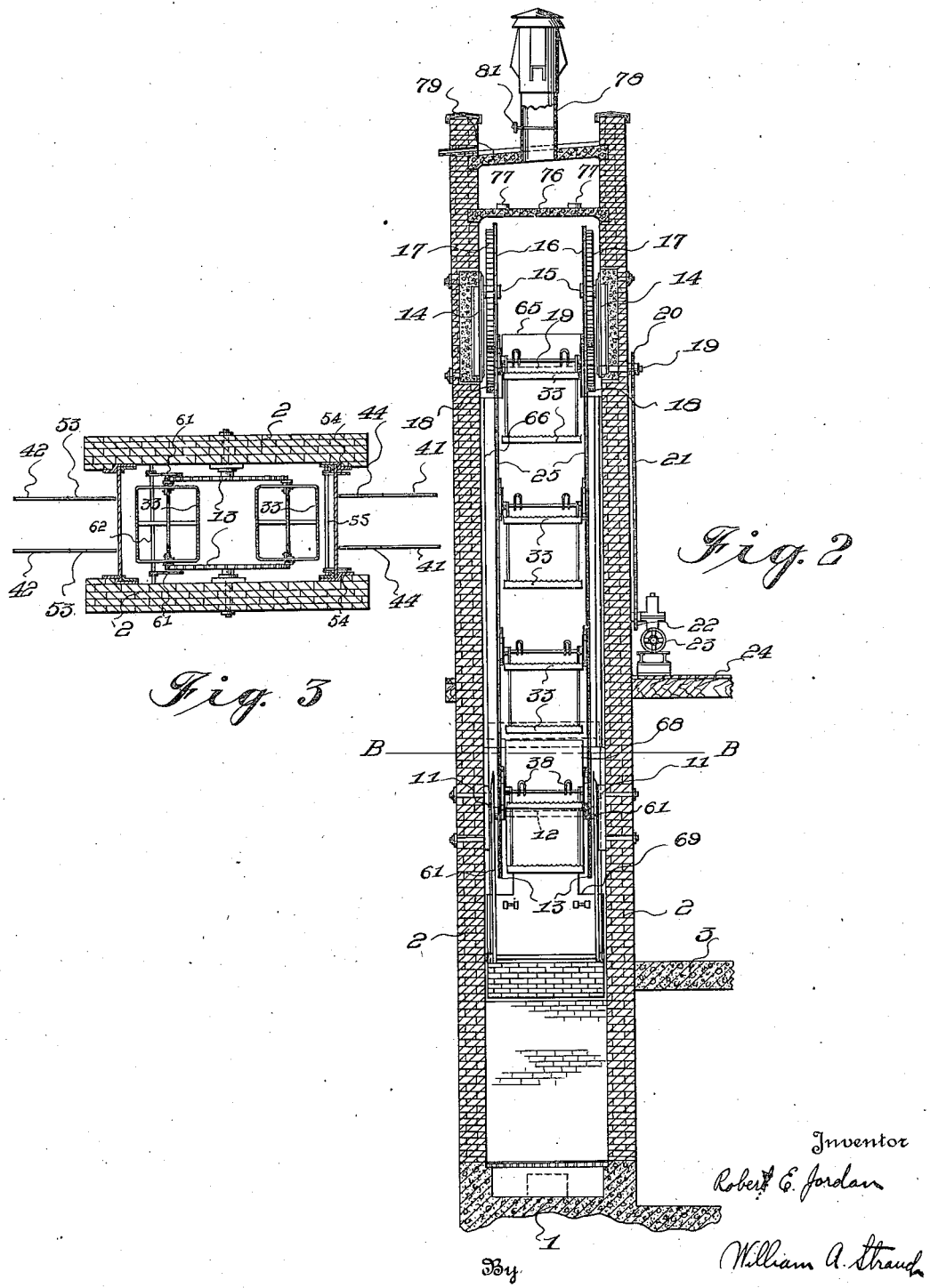

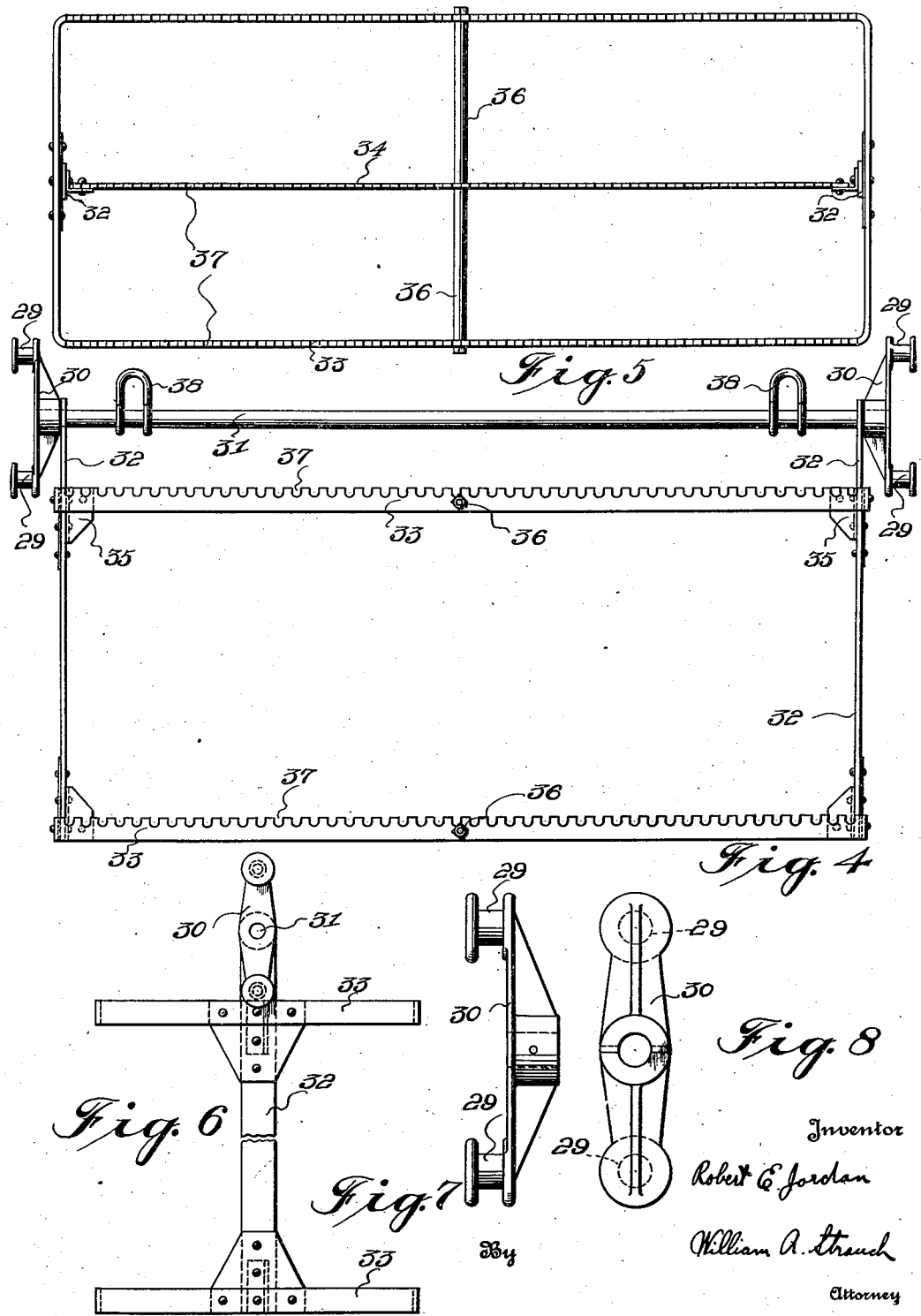

April 22, 1930.  R. E. JORDAN  1,755,878
CONTINUOUS SMOKING, CURING, AND TREATING APPARATUS
Original Filed Sept. 18, 1925   4 Sheets-Sheet 4
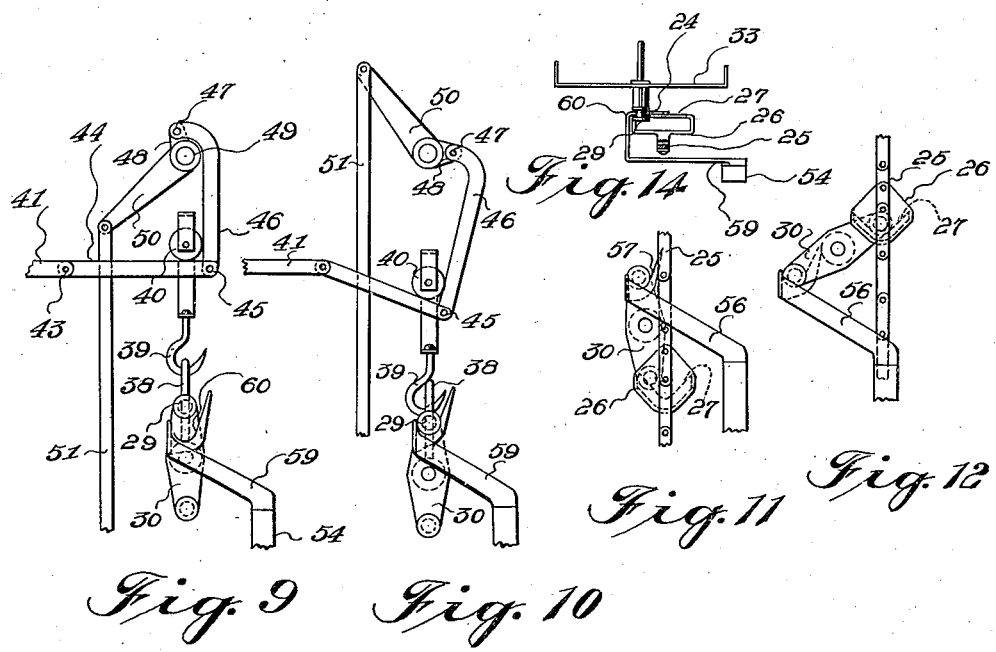
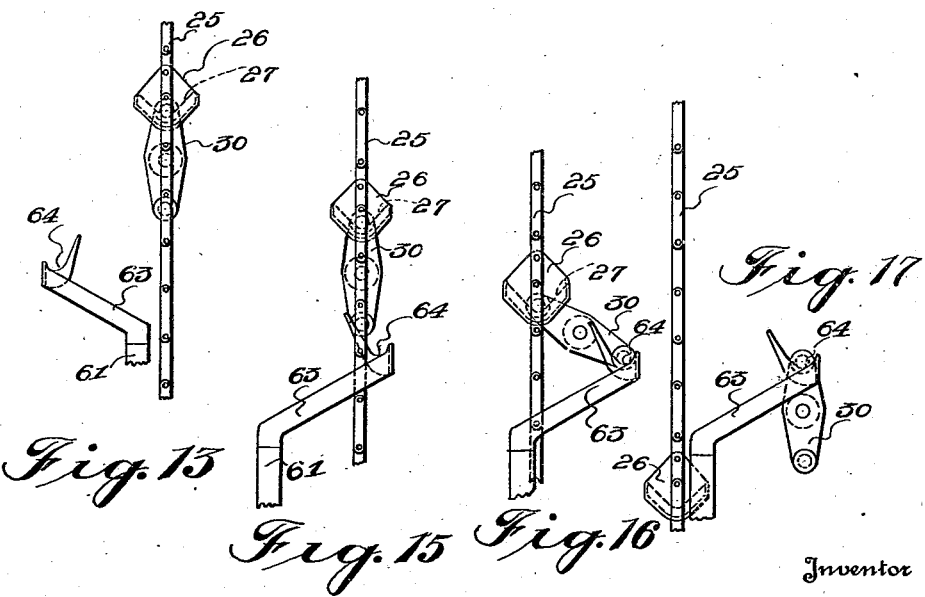

Patented Apr. 22, 1930

1,755,878

UNITED STATES PATENT OFFICE

ROBERT E. JORDAN, OF CHICAGO, ILLINOIS, ASSIGNOR TO THE ALLBRIGHT-NELL COMPANY, OF CHICAGO, ILLINOIS, A CORPORATION OF ILLINOIS

CONTINUOUS SMOKING, CURING, AND TREATING APPARATUS

Application filed September 18, 1925, Serial No. 57,191. Renewed September 17, 1929.

The present invention relates to smoking, curing and drying apparatus.

More particularly the invention relates to smoking, curing and drying arrangements in which the articles to be treated may be loaded into and removed from continuously operating or moving conveying means in mechanical and substantially automatic manner. Various arrangements have been heretofore proposed for automatically loading and unloading conveyors with articles to be smoked or cured but these prior proposed arrangements have not been satisfactory commercially because of the complicated, unreliable mechanisms used and because of defects in the operation thereof. In Patent No. 1,053,249 a smoke house is shown in which carriers loaded with articles to be cured are placed on an elevator and raised into position to be picked up by an endless wheel conveyor in a smoking chamber. To remove the carriers from the conveyor, the same elevator is used. This arrangement is inefficient and a number of manually controlled operations are necessary to effect the loading and unloading of the carriers to and from the conveyor. Patent No. 1,494,903 shows a proposed automatic smokehouse arrangement in which a conveyor having a plurality of carriers is arranged so that meat carrying carriages may be automatically loaded into the carriers, a special mechanism must be provided in each carrier making the arrangement expensive to construct. A further defect in this construction is that an attempt is made to load and unload the conveyors with the meat carrying carriages by utilizing the same mechanism. This method of operation necessarily is more or less unsatisfactory for the reason that simultaneous loading and unloading of the conveyor is impossible and continuous curing, drying and smoking cannot be carried out.

Accordingly, objects of the present invention are to provide improved curing, smoking or drying arrangements in which simplified, novel and more efficient loading and unloading mechanisms for the transfer of articles to be treated to and from the treating chamber are provided and to provide improved curing, smoking and drying apparatus in which the loading and unloading together with the treatment of the articles may be carried out simultaneously so that untreated articles may be loaded into the conveyor continuously at one point and the completely smoked or cured articles may be continuously removed at another point. In the processing and smoking of sausages, particularly frankfurters, by first drying the casing of the sausage and removing the dampness from the exterior thereof, and then subjecting the dried sausage to the action of smoke for a suitable interval at a temperature of about 120 degrees Fahrenheit a highly desirable color and appearance is imparted to the sausage. The sausage is effectively prepared for the coloring if subjected to the gases of combustion for a suitable interval and to smoke heated to temperatures of about 150 degrees Fahrenheit. While various efforts have been made to process and color sausage in this manner no prior methods and apparatus have maintained the proper drying and coloring conditions due to faulty constructions. Another object of the invention is to provide a continuous processing and coloring apparatus for articles such as sausage in which separated zones in which proper conditions for drying and depositing a suitable color on the sausage casing are continuously maintained and through which the sausages are continuously passed without causing a substantial departure from the desired conditions. In this way uniform sausage of improved quality and general appearance is provided.

Because of the fact that prior smoking arrangements have permitted the smoke to pass through the entire smoking chamber; substantial waste of fuel has occurred in the arrangements heretofore proposed. Accordingly a further object of the invention is to provide a novel treating chamber arrangement in which the smoke or heated treating gases are permitted to pass through those sections only of the chamber in which the articles to be smoked are compelled to travel. In this way, a more economical utilization and distribution of the smoking, curing and drying gases is secured.

Still another object of the invention is to provide a smoking, curing, or treating apparatus provided with a conveyor continuously loading and unloading articles while the treatment of articles carried on the conveyor proceeds, and also may be utilized for the treatment of articles by continuously circulating the same through the treating chamber for a long period of time, with an economical utilization of the treating gases under either condition of operation.

Further objects of the invention are such as may be attained by the utilization of the various combinations, subcombinations, and principles hereinafter more fully set forth and as defined by the scope of the appended claims.

As shown in the drawings,

Figure 2 is a sectional view taken along line AA of Figure 1.

Figure 3 is a sectional plan view taken along line BB of Figure 2.

Figure 4 is a side elevation of a preferred form of carriage adapted for use with the invention.

Figure 5 is a plan view of the carriage shown in Figure 4.

Figure 6 is an end view of the carriage shown in Figure 4.

Figure 7 is a detailed side view of a supporting arm for the carriage.

Figure 8 is an end view of the arm shown in Figure 7.

Figure 1:
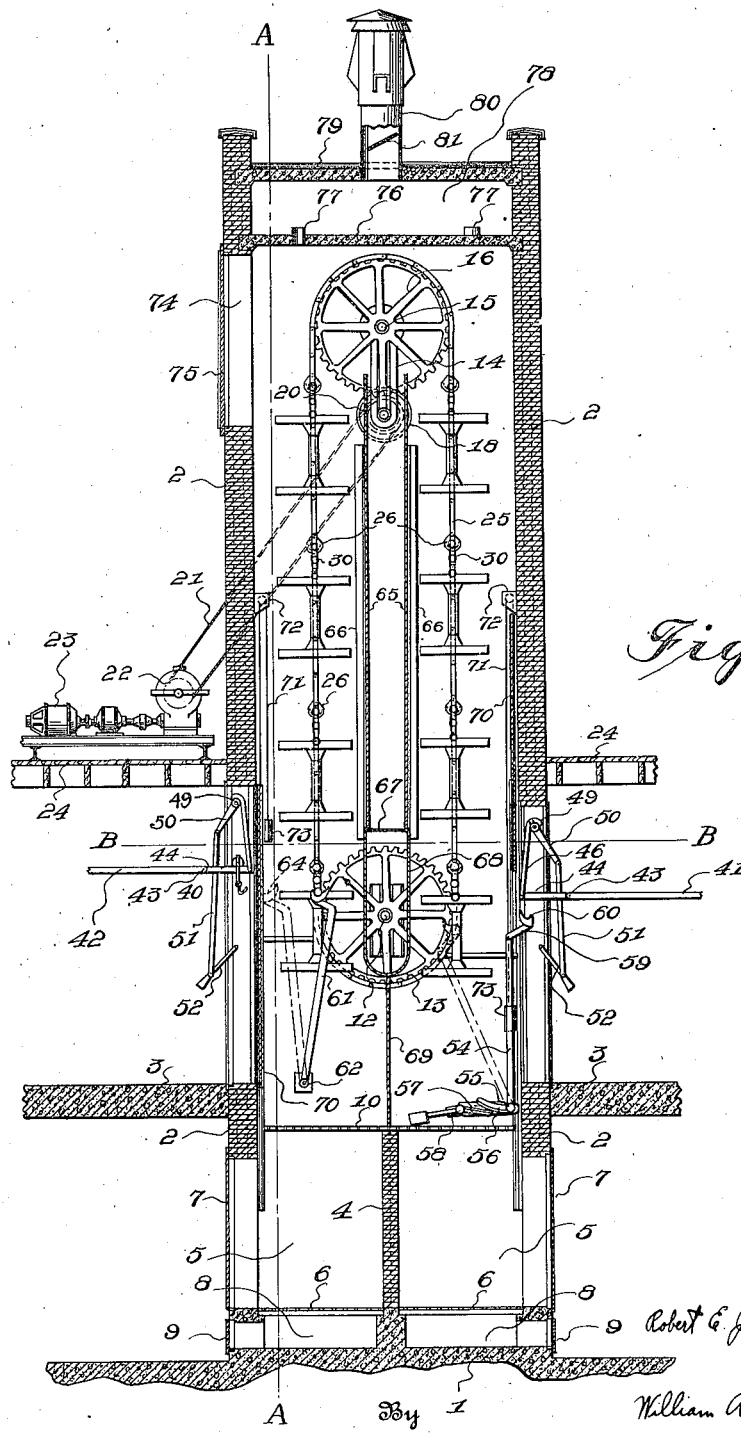
Figure 1 is a sectional side elevation through a preferred arrangement of the invention.

Figures 9 to 13 inclusive are fragmentary views with parts omitted showing the positions assumed by the parts in loading a carriage on the conveying means.

Figure 14 is a detailed plan view showing the relative arrangement of the loading members and conveying members.

Figures 15, 16 and 17 are detailed fragmental views with parts omitted showing the position of the parts during unloading of the carriage from the conveying means.

Referring to Figures 1 and 2, foundation 1 of any suitable material, such as concrete, is provided upon which the side walls 2 of the smoke or treating house, which may be of brick or other suitable material, are built. The side walls 2 extend upward from the foundation 1 through a loading floor 3, and a dividing wall 4 below the loading floor 3 divides the lower part of the smoke house into two combustion or smoke or gas producing chambers 5. At the bottom of the chambers 5 the perforated plates or grates 6 are provided which rest on extensions of the foundation 1. Doors 7 in the side walls 2 of the chamber provide means for charging the chambers 5 with smoke or gas producing materials. Below the perforated plates or grate members 6 are formed the ash pits and air chambers 8 which are provided with suitable doors 9. Resting on the top of the dividing wall 4 is a grating 10 which forms a floor for the smoking or curing chamber of the smoke house and through the openings of which the smoke or gases pass from the chamber 5 into the treating or curing chamber.

Supported in the side walls 2 of the smoke house by anchor plates or in any other suitable manner are the bearing plates 11 which are provided with suitable supporting journal boxes or bearings for the sprocket shaft 12. Rigidly secured to the shaft 12 and rotatable therewith are the lower sprockets 13. In the upper part of the smoke or curing chamber, the bearing plates 14 are secured in the side walls 2 in any suitable manner. Bearing plates 14 rotatably support the upper sprocket supporting stub shafts 15, and journaled on the stub shafts 15 in any suitable manner are the upper sprockets 16 which have secured thereto and are driven by the shaft 19 suitably journaled in bearing plates 14. The shaft 19 is driven by means of a sprocket 20, chain 21, and the sprocket 22 from motor 23 which is suitably supported on a platform 24 above the level of the loading floor 3. Passing around the sprockets 13 and 16 are the endless chains 25 to which are secured at suitably spaced intervals the carriage supporting or carrying members 26 (Figs. 1, 13 and 14). The supporting members 26 are provided with the depressions or grooved sections 27 in which the lifting projections 29 of the smoking carriages are adapted to rest.

As shown in Figures 5 to 8 the carriage lifting projections or members 29 are secured to the lifting arms 30 which in turn are journaled for rotation on the ends of the supporting rod 31. Secured to and depending from the rod 31 are the carriage side members 32 to which the smoke stick supporting frames 33 are secured. Central stick supporting members 34 are fastened by means of members 35 to the frame members 32 and the stick supporting members are spaced apart by the central strengthening rods 36. Formed in the upper edges of the frames 33 and the supporting members 34 are the stick supporting notches 37 in which the ends of sticks or rods supporting the articles to be smoked, cured or dried are adapted to rest in well known manner. Secured to the rod 31 are the carriage supporting members or eyes 38 which are shaped to receive the hooks 39 (Figs. 9 and 10) of the supporting trolley members 40. The supporting trolley members 40 are adapted to run on the overhead loading and unloading tracks 41 and 42 on which the carriages are adapted to be pushed or conveyed to suitable carriage loading and unloading points.

Pivoted to the ends of the loading and unloading tracks 41 and 42 at points 43 are the track sections or extensions 44 (Figs. 1, 9 and 10). The outer ends of the extensions 44 are pivotally connected at points 45 to the lower ends of links 46, and the upper ends of the links 46 are connected at points 47 to the operating arms 48. Operating arms 48 are secured to and rotatable with suitably supported actuating shafts 49 which in turn have secured thereto the actuating arms 50. The ends of arms 50 are pivotally secured to the upper ends of links 51, the lower ends of which are pivotally connected to operating levers 52 (Fig. 1) which are pivotally supported from the side walls 2 of the smoke house at their inner ends.

A pair of loading transfer members 54 (Fig. 1) are secured at their lower ends to a shaft 55 which in turn is suitably supported in journals mounted in the side walls of the smokehouse. Secured to the shaft 55 is an extension or cam arm 56 which is normally engaged by the end of a counterbalancing weight member 57 pivotally supported from the sidewalls 2 on a suitable supporting spindle 58. Secured to the upper ends of the transfer members 54 are the extensions 59 which are provided with the carriage receiving grooves 60. In the outer positions of the members 54 the grooves 60 are disposed directly beneath the end of the loading track extensions 44 as shown in Fig. 9, and are so positioned with relation to the projections 29 of a carriage suspended from trolleys 40 at the end of the track that as the track extensions are lowered in the manner shown in Figure 10, the projections 29 will be received in the grooves 60 of the extensions 59. In the inner position of the members 54 as shown by the dot and dash line in Figure 1, the extensions 59 of the members 54 will be positioned as shown in Figure 14 with relation to the chain carried members 26, so that as the chain 25 moves upward the inner surface of the carriage lifting members 26 will pass outside of the grooves 60 of the extensions 59 in a manner to engage and pick up the carriage extensions 29 in the grooves 27 as will more fully hereinafter appear.

Adjacent the unloading opening of the smoke house, the lower ends of the unloading transfer members 61 are secured to a shaft 62 which in turn is supported from the side walls of the smokehouse in suitable journals or bearings (Fig. 1). The upper ends of transfer member 61 are provided with extensions 63 (Fig. 13) which are in turn provided with the carriage receiving grooves 64. With the members 61 in the full line position shown in Figure 1 the extensions 63 with the grooves will be positioned adjacent the inner surface of the carriage lifting members 26 in the manner shown in Figure 14, so that as the carriages are lowered the carriage projections 29 will come to rest in the grooves 64 as will more fully hereinafter appear.

A central dividing structure for the treating chamber is provided comprising the sheets 65 (Figs. 1 and 2) which are secured to the side walls of the smoke house by means of suitable supporting angle irons 66. A bottom plate 67 is secured between the lower ends of the sheet or plates 65 and an apron 68 extends from the bottom of the plates 65 around the lower sprocket shaft 12. A removable dividing plate 69 is provided which extends between the lower point of the apron 68 and the floor or grating 10 of the treating chamber. The plates 65 to 69 divide the treating chamber substantially into two sections or zones with a heat insulating space between the sections and the smoke or gases are compelled to rise substantially only in the space in which the carriages are adapted to move. It will accordingly be seen that the smoke or gases are permitted to pass through the separated sections or zones of the treating chamber only in which the articles to be treated travel and different conditions may be established and maintained in each zone. In this way proper drying and coloring conditions may be maintained and a more economical distribution and utilization of the smoke gases in the treating chamber is attained.

The loading and unloading openings of the smoke or treating house are provided with the closing doors 70 which are adapted to slide vertically in suitable guideways and are suspended from the supporting cables 71 which pass over the pulleys 72 and are counterbalanced by the weights 73. Opening 74 at the top of the treating chamber and opposite the upper sprockets 16 is provided for convenient access to the mechanism and is closed by a suitable door 75. The ceiling or top 76 for the treating chamber is provided with a plurality of smoke or gas ducts 77 preferably disposed substantially at the four corners of the ceiling and the smoke or gases pass from the upper part of the smoke chamber through the ducts 77 into a chamber 78 which is formed by the ceiling 76 and roof 79. A ventilator or stack 80 through which the smoke or gases pass to atmosphere is provided in the roof 79, and a damper 81 is provided in the stack.

Operation

In operation the articles to be treated or cured are placed on suitable supporting sticks or rods which are then mounted in the supporting carriages with the ends thereof supported in the notches 37. A loaded carriage is suspended from the hooks 39 of a pair of trolleys 40 and is then pushed along the tracks 41 until the trolleys 40 are at the ends of extensions 44 of the tracks with projections 29 over grooves 60 of extensions 59 as shown in Figure 9. The handle or arm 52 is then raised and the parts will assume the positions shown in Figure 10, with the extensions 44 depressed and the hooks 39 disengaged from the carriage supporting members or eyes 38. In this position the carriage will be supported in the grooves 60 of the transfer member extensions 59 within the loading entrance of the smokehouse. The operator then pushes the transfer members 54 together with the carriage until the position shown in the dot and dash line position of Figure 1 is assumed by the transfer members 54. In this position of the parts the outer portions of the projections 29 of the carriage will be in the path of the carriage supporting members 26 which are secured to the conveyor chains 25. The conveyor chains 25 are driven at a proper rate of speed by the motor 23 through the sprockets 22, chain 21, sprocket 20, and the gears 18 and 17 as above set forth. As the conveyor chain moves upward in Figures 1, 11, 12 and 13, the lower pair of projections 29 of the carriage arms 30 will nest in the grooves 27 of the members 26, and as the movement of the conveyor chains 25 continues upward, the lower projection 29 of the arms 30 will be raised and will successively assume the positions shown in Figures 11, 12 and 13. As the lower projections 29 of the carriages 30 are raised, the members 54 will be forced to the right in Figure 1 and to the left in Figures 11 and 12, and as the transfer is completed the projections 29 are withdrawn from the grooves 60 of extensions 59. The counterbalancing weight member 58 will then function to restore the members 54 to the full line position shown in 51 where they will be ready to receive the next carriage. In this way the conveyor chains are loaded with carriages filled with articles to be treated.

To remove a carriage containing completely treated articles from the house, the members 61 are positioned as shown in Figures 14 and 15 so that the projections 29 of the arms 30 will drop into the notches or grooves 64 as a loaded carriage comes adjacent the unloading door. As the chain passes downward, the weight of the loaded carriage forces the members 61 and 63 to the left in Figure 1 and to the right in Figures 14, 16 and 17. As the downward movement of the supporting members 26 continues, the arms 30 will turn through 180 degrees and members 26 will be disengaged from the projections 29. The weight of the carriage will then throw the members 61 to the left in Figure 1 until the lifting eyes 38 of the carriage are directly beneath trolley hooks 39 or trolleys supported on the extensions 44 of the unloading tracks 42. The sections 44 of the unloading tracks are dropped by raising the control arm 52 until the hooks 39 of the trolleys may be hooked into the eyes 38 of the carriage. The arm 52 is then lowered and the section 44 of the unloading track is raised into alignment with the unloading tracks 42. The loaded carriage together with the treated articles is then pushed to a convenient unloading location and the articles are removed. After the carriage is removed from the transfer 61 to the unloading track 42, the members 61 are again moved to the full line position shown in Fig. 1, either manually or by means of a suitable counterbalancing weight such as is shown to return members 54.

If the articles to be treated are relatively small or require a relatively short time of treatment, as for example when smoking sausage, the dividing plate 69 may be positioned as shown in Figure 1 and the doors 70 are kept open. Plates 69 separates the chamber into two zones each supplied with gases from the combustion chamber individual thereto and also cuts off any tendency for a draft to sweep through the treating chamber from the loading to the unloading openings and eliminates a tendency for smoke to escape through the loading and unloading doors. The combustion is regulated in the chamber 5 to maintain proper treating conditions in the separated zones. For coloring frankfurters a temperature of about 150 degrees Fahrenheit is maintained in the right zone in Figure 1, in which the cages pass upward, and a temperature of about 120 degrees Fahrenheit is maintained in the left zone in Figure 1, in which the cages pass downward. The chains 25 are then driven at such a rate that treatment of the articles is completed as the carriages reach a position adjacent the unloading opening. The carriages containing untreated articles of this character may be continuously loaded on the chains at the loading entrance and removed at the unloading entrance as above set forth, and the smoking or treatment proceeds continuously, while the carriages are being loaded and unloaded.

When articles such as hams or bacon which require a relatively long time to thoroughly cure or smoke are to be treated, the plate 69 is removed so that carriages may pass around the bottom of the conveyor. In this case the chains are loaded full with carriages containing unsmoked articles. After the loading is completed, the doors 70 are closed and the articles are permitted to remain in the treating or curing chamber until the operation is completed. The chains 25 may be brought to rest while the articles are smoking, but are preferably driven continuously so that the articles are smoked or cured in uniform manner. When the smoking is completed, the unloading door 70 is opened and the carriages are removed in the manner set forth.

It will be noted that the smoke or gases from the chamber 5 pass upward on opposite sides of the apron 68 and the sheets 65 are compelled to travel in the path where they will contact with the articles to be smoked and do not pass through the central part of the smoking chamber. At the top of the treating chamber the smoke passes through ducts 77 in the ceiling of the smoking chamber into the space 78. In this way, it will be seen, economical distribution and utilization of the smoke is effected. By providing the space 78 between the top of the treating chamber and the roof of the house, cooling of the top of the treating chamber due to the contacting with the atmosphere is eliminated and condensation of moisture on the inner surface of the treating chamber ceiling is eliminated.

It will accordingly be seen that an improved smoking, curing or treating arrangement is provided in which simplified mechanical loading and unloading devices are utilized, and in which the cost and labor of handling of the articles to be treated is materially reduced, while a preferred embodiment of the invention is not limited to the form shown and described and that many variations thereof may be made by those skilled in the art without departing from the spirit of my invention.

Accordingly, what is desired to be secured by Letters Patent and is claimed as new is:

1. In combination, a treating chamber; conveying means in said treating chamber; removable carriages for said conveying means; mechanical means for automatically transferring said carriages from a point outside of said treating chamber to said conveying means; and separate mechanical means for automatically transferring said carriages from said conveying means to a point outside of said treating chamber.

2. A smoke house comprising a smoking chamber; conveying means in said chamber; and separate means for automatically loading and unloading said conveying means.

3. In combination, a curing and drying chamber; tracks leading to and from said chamber; meat carrying means adapted to be conveyed along said tracks; an endless conveyor in said chamber; and means for mechanically transferring said meat carrying means between said tracks and said conveyor.

4. In combination, a curing chamber; a loading track leading to said chamber; an unloading track leading from said chamber; means for conveying articles to be cured along said tracks from convenient loading and to convenient unloading points; conveying means in said chamber adapted to convey said first mentioned means through said chamber from a point adjacent said loading track to a point adjacent said unloading track; and means for transferring said first mentioned means between said tracks and said conveying means.

5. A continuous smoke house comprising a smoking and curing chamber; means for conveying articles to be cured continuously from a loading point through said chamber to an unloading point; and means at said loading and unloading points for simultaneously loading and unloading said conveying means with articles while the curing of articles carried by said conveying means proceeds.

6. In combination vertical endless conveying means; carrying means adapted to be removably mounted in said conveying means; a track terminating adjacent said conveying means; means for conveying said carrying means along said track; means adapted to receive said carrying means from said last mentioned conveying means and to transfer the same to said first mentioned conveying means; and means operated by the weight of said carrying means for transferring said carrying means from said track to said last mentioned conveying means.

7. In combination vertical endless conveying means; carrying means adapted to be removably mounted in said conveying means; and transfer means adjacent said conveying means adapted to receive said carrying means from said conveying means and actuated by the weight of said carrying means to transfer said carrying means from and to move the same away from said conveying means.

8. The combination as set forth in claim 7 in which said transfer means removes said carrying means from said conveying means to a point adjacent a conveying track, and means for receiving said carrying means from said transfer means and conveying the same along said track.

9. In combination conveying means; carrying means removably supported by said conveying means; and transfer means adjacent said conveying means adapted to receive said carrying means from said conveying means and actuated by the weight of said carrying means to transfer said carrying means from and move the same away from said carrying means.

10. The combination as set forth in claim 9 together with a second conveying means adapted to receive said carrying means from said transfer means at the end of movement of said transfer means.

11. In combination a track comprising a movable section; means for raising and lowering said movable section; carrying means and means for conveying the same along said track; transfer means adapted to receive said carrying means disposed beneath said movable section; and conveying means adapted to receive said carrying means from said transfer means.

12. In combination, conveying means; carrying means removably supported by said conveying means; transfer means adapted to move said carrying means from said conveying means; a track comprising a movable section disposed above said carrying means at the end of the movement of said transfer means away from said conveying means; means for raising and lowering said movable track section; and means supported on said track for receiving said carrying means.

13. A carrier for articles to be smoked or cured comprising a framework adapted to support the articles; and a pair of lifting arms disposed at the sides of said frame, each comprising a plurality of lifting projections.

14. The combination as set forth in claim 13 in which said lifting projections extend outwardly from said arms, and said arms are rotatable with relation to said carriage.

15. In combination, a smoking or curing chamber; endless conveying means in said chamber; carrying means supported by said conveying means; and means for preventing smoke and curing gases from passing upward through the central space of said chamber between the inner sides of said carriages.

16. The combination as set forth in claim 15 in which said last mentioned means divides said chamber into separated curing sections, together with a smoke generating combustion space individual to each of said separated sections.

17. In combination, a curing chamber, an endless conveyor in said chamber; carriers supported in and movable with said conveyor; means for preventing curing gases from rising through the central section of said chamber and a removable central dividing plate positioned between the bottom of said means and said chamber.

18. A smoke house comprising a smoking and curing chamber; means in said chamber dividing same into a pair of separate zones; a smoke producing chamber in communication with each zone and an endless conveyor for conveying articles to be cured continuously through said separate zones.

19. In combination, a curing chamber; a pair of upper sprockets in said chamber; a pair of lower sprockets in said chamber; an endless conveyor passing continuously over said sprockets; chamber dividing means between said upper sprockets and said lower sprockets; an apron extending from the bottom of said dividing means and terminating between said lower sprockets; and means extending from said apron to the bottom of said curing chamber.

20. A smoke house comprising a vertical chamber; a horizontally disposed grating in said chamber; a vertically disposed wall between said grating and the bottom of said chamber defining therewith a pair of combustion chambers; a pair of sprockets rotatably supported adjacent the upper end of said vertical chamber; a second pair of sprockets rotatably supported adjacent and above said grating; a pair of vertically disposed dividing plates between said pairs of sprockets; an apron extending from the lower ends of said plates around the axes of said second pair of sprockets; a dividing plate extending from said apron to said grating; and an endless conveyor passing over said pairs of sprockets.

21. In combination, a treating chamber; tracks leading to and from said chamber; an endless conveyor in said chamber for removably supporting meat carrying means; means movable on said tracks for transporting said carrying means to and from said chamber; mechanical means for transferring said carrying means from said movable means on said track leading to said chamber to said conveyor; and other mechanical means for transferring said carrying means from said conveyor to said movable means on said track leading from said chamber.

22. The combination as set forth in claim 21 in which each of said tracks comprises a movable section; and manually operable means associated with said sections for lowering same into proximity to the respective transferring means.

23. The combination as set forth in claim 21 in which each of said carrying means comprises an article supporting frame provided with looped supporting members; and in which each of said movable means comprises trolley members provided with hooks for detachably engaging said looped supporting members.

24. The combination as set forth in claim 21 in which said first mechanical transferring means comprises a pair of members pivotally supported at one end thereof on a shaft secured in said chamber; means carried by the opposite ends of said members for detachable engagment with said carrying means; an arm carried by said shaft; and means supported in said chamber for engaging said arm for normally holding said members in inoperative position.

25. The combination as set forth in claim 21 in which said second mechanical transferring means comprises a pair of members pivotally supported adjacent one of the ends thereof; said members at the opposite ends thereof provided with means for detachable engagement with said carrying means; said members being so arranged relative to said conveyor and said respective movable track section that the weight of the successive carrying means upon movement of said conveyor will move said members to a position adjacent the ends of said movable track section.

26. A carrier for articles to be smoked or cured comprising a pair of rectangular frame members; a longitudinally disposed supporting member extending intermediate the sides of each frame member and having its ends secured to the ends of said frame member; supporting members secured to the ends of said frame members; a longitudinally disposed rod having the opposite ends thereof secured to and projecting outwardly of said supporting members; eye members supported by said rod; and lifting arms rotatably supported by the projecting ends of said rod.

27. The combination as set forth in claim 26 in which each of said frame members and said supporting members are provided with stick supporting notches.

28. A smoke house comprising a pair of combustion chambers; a smoking and treating chamber above said combustion chambers; means in said smoking and treating chamber dividing same into a pair of treating zones respectively in alinement with said combustion chambers; an endless conveyor in said smoking and treating chamber; and loading and unloading means at opposite sides of said smoking and treating chamber adjacent said combustion chambers.

29. In combination, a treating chamber, a conveyor in said chamber, a plurality of carriages detachably mounted on said conveyor, said carriages being adapted to receive articles to be treated in said chamber, means for mechanically transferring carriages to said conveyor from a point outside the chamber, and other means for transferring said carriages from said conveyor to a point outside the chamber.

30. In the combination defined in claim 29, said transferring means being separately mounted in association with separate doorways which are disposed in the chamber walls in proximity to the path of travel of said carriers.

In testimony whereof I affix my signature.
ROBERT E. JORDAN.